Patented Apr. 4, 1939

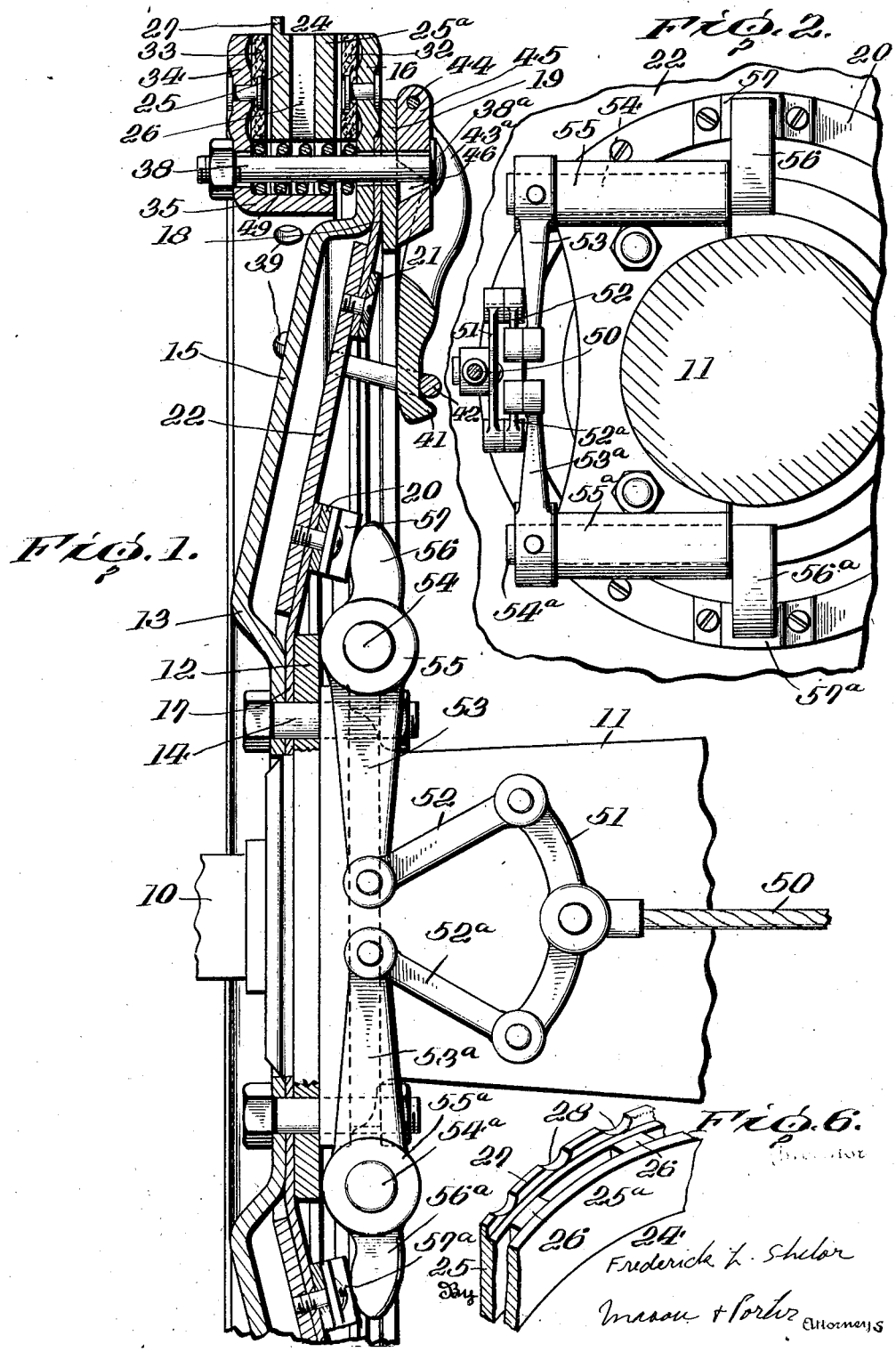

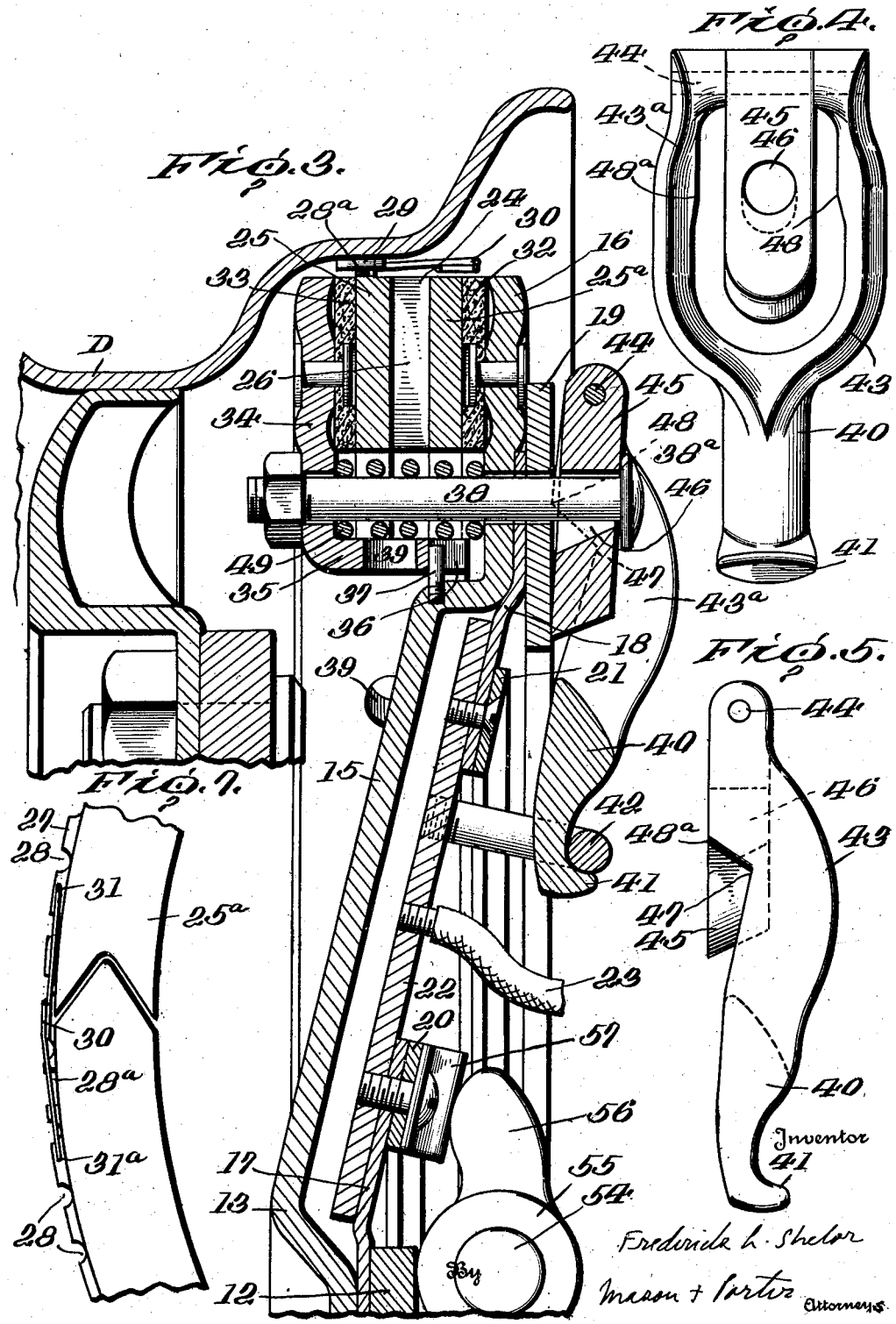

2,153,280

UNITED STATES PATENT OFFICE 2,153,280

BRAKING DEVICE

Frederick L. Shelor, Sandston, Va., assignor to Innovation Brakes, Inc., Richmond, Va., a corporation of Virginia Application November 2, 1936, Serial No. 108,876

9 Claims. (Cl. 188—72)

The present invention relates to new and useful improvements in a braking device for rotating parts and more particularly to a braking device which includes a plurality of discs movable relative to one another for applying braking force.

An object of the invention is to provide a braking device of the above type which may be independently operated either by fluid pressure means or by mechanical means.

A further object of the invention is to provide a braking device of the above type wherein a lever mechanism is utilized for increasing the braking force normally exerted by the relative movement of the discs.

A further object of the invention is to provide a braking device of the above type wherein both the fluid pressure actuating means and the mechanical actuating means operate through the same lever mechanism for applying the braking force.

A still further object of the invention is to provide a braking device of the above type wherein the construction is such that the braking surfaces are subjected to an air cooling effect.

The above and other objects of the invention will in part be obvious and will be hereinafter more fully described.

In the drawings:

Fig. 1 is a vertical section through the rotatable member showing the braking mechanism applied thereto.

Fig. 2 is a fragmentary side elevation showing the mechanical actuated means.

Fig. 3 is an enlarged fragmentary vertical section, similar to Fig. 1, showing the braking means in engagement.

Fig. 4 is a top plan view showing the compound lever.

Fig. 5 is an end view of the same.

Fig. 6 is a fragmentary view in perspective showing a portion of the braking surface.

Fig. 7 is a fragmentary side elevation showing the connection between the ends of the braking surface.

The invention relates generally to a fluid-pressure-operated braking device wherein a series of levers are used for moving the brake shoes into contact with the braking member. More specifically, however, the present invention utilizes a compound lever mechanism for further increasing the braking force normally exerted by the relative movement of the discs and also provides mechanical actuating means which may be operated independently of the fluid pressure actuating means. To this end, the invention is illustrated as applied to a vehicle wheel but it is to be clearly understood that it may be used in connection with any rotating member. A stationary disc is rigidly fixed to a stationary member and located within a rim which carries a braking member. A second disc is mounted within the rim for cooperation with the stationary disc and is secured to the stationary member and to the stationary disc by flexible connections in the form of diaphragms which prevent its rotation, but which permit a limited axial movement thereof toward and away from the cooperating stationary disc. The flexible connections between the two discs form an air-tight seal so that the space or chamber between the two discs may be placed under vacuum for causing the movable disc to shift toward the stationary disc. Cooperating brake shoes are disposed on opposite sides of the braking member. One of the brake shoes is carried directly by the stationary disc and the other is movable with respect thereto. The movable brake shoe is operated by the movable disc through a compound lever mechanism so that, when the chamber between the two discs is placed under vacuum, the shifting of the movable disc toward the stationary disc operates through the lever mechanism to shift the movable brake shoe toward the stationary brake shoe and thus contact and clamp the intermediate braking member between the two shoes. The compound lever mechanism operates to greatly increase the normal braking force incident to the shifting of the movable disc toward the stationary disc. Spring means are provided for separating the brake shoes and the discs when the braking pressure thereon is released. In addition to the fluid pressure actuating means, there is provided, as stated above, a mechanical actuating means for effecting relative movement of the brake shoes. The mechanical actuating means includes a plurality of levers which operate through contact with the movable disc to force the same toward the stationary disc. This mechanical shifting of the movable disc will operate through the same lever mechanism to apply the increased braking force on the brake shoes. Thus, upon failure or upon the occurrence of any defect in the fluid pressure line, the brake may still be operated mechanically. The braking member is provided with a number of openings therethrough so as to permit air to pass outwardly by centrifugal force. The member carrying the movable brake shoe is provided with openings to permit air to pass therethrough.

As a result, when the brake shoes are applied, air is caused to pass out through the braking member and cool the same and when the brake shoes are separated from the braking member, air will pass between the braking surfaces and aid in cooling the same.

Referring more in detail to the accompanying drawings, the invention is shown as applied to a wheel which is carried by a spindle 10. The stationary member 11 is provided with an annular shoulder 12 to which the inner edge of an annular disc 13 is secured by bolts 14 or the like. The disc 13 is shaped to provide an annular recessed portion 15 and a substantially vertical annular edge portion 16. The disc 13, thus secured to the stationary member, is stationary and non-rotating. The inner edge of an annular flexible diaphragm member 17 is clamped between the inner edge of the disc 13 and the shoulder 12 on the stationary member. The outer edge of a similar annular flexible member 18 is secured between the outer face of the edge portion 16 of the disc 13 and an annular clamping plate or ring 19. The free edges of both of the flexible members 17 and 18 are secured between clamping plates or rings 20, 21 respectively and a shiftable annular disc 22 by screws or the like. The shiftable disc 22 is substantially co-extensive with the recessed portion 14 of the disc 13 so that a minimum amount of space is occupied by the discs within the rim. The disc 22, thus secured, is also non-rotating but a shifting movement thereof toward and away from the stationary disc 13 is permitted by means of the flexible connecting members 17 and 18 which form a seal around the edges of the two discs so that there is provided therebetween a chamber which may be placed under vacuum. A flexible pipe 23 is connected to the movable disc 22 and affords communication with the chamber between the two discs and a vacuum creating device.

A braking member 24 is connected to the rim D (Fig. 3), that is, the braking member is secured to the rim so that it will rotate therewith but will also be permitted to shift axially of the rim when the brake shoes are brought into contact therewith. As shown particularly in Figs. 3, 6 and 7, the braking member 24 includes side portions 25, 25a which are spaced apart by means of interposed sections 26, which are also spaced apart to provide a plurality of air channels between the side portions 25, 25a of the braking member. The side portion 25 of the brake member 24 is provided with an upstanding rib 27 which contacts with the rotating member D and is provided with a plurality of recesses 28 therethrough for permitting the circulation of air. The rotating member D is provided with spaced lugs 29 which fit within symmetrically spaced recesses 28a (Fig. 7) in the rib 27. The recesses 28a are provided with vertical sides to engage the lugs 29 so that the braking member 24 will rotate with the member D, but, at the same time, be permitted to shift axially thereof when the braking force is applied. A V-shaped slot (Fig. 7) is cut across the braking member 24 so as to prevent the ends from moving radially while permitting them to move toward and away from each other. The adjacent ends of the braking member 24 are spaced apart sufficiently to permit expansion thereof when heated during the application of the braking pressure. A spring 30 has the ends 31, 31a thereof embedded in portions of the rib 27 on opposite sides of the V-shaped cut and this spring tends to normally separate the ends of the braking member so that when the parts are not heated, the braking member is still expanded in order to make contact with the rotating member D to thus prevent rattling. As shown in the drawings, the spring 30 extends laterally of the braking member 24.

The edge portion 16 of the stationary disc 13 carries a stationary brake shoe 32 which is disposed on one side of the braking member 24. A brake shoe 33 is secured to an annular member 34 which is provided with an inwardly turned axially directed portion 35. The edge of the inwardly directed portion 35 extends to a point adjacent the outer edge of the recessed portion 15 in the stationary disc 13 and is provided with a plurality of spaced slots 36 at the edges thereof. The stationary disc 13 carries a plurality of similarly spaced pins 37 which extend into the slots 36, thus preventing rotation of the annular member 34, but permitting the shifting thereof toward and away from the cooperating brake shoe 27. The annular member 34 is mounted on spaced pins 38 which extend therethrough and also through the edge portion 16 of the disc 13 and also through the clamping plate 19. The inwardly directed portion 35 of the annular member 39 is provided with a relatively small number of spaced openings 39, the purpose of which will be hereinafter described.

The compound lever which is utilized for increasing the braking force normally exerted by the movement of the shiftable disc 22 toward the stationary disc 13 is shown in detail in Figs. 4 and 5. There are a number of these levers spaced around the shiftable disc 22. Each lever includes an arm or shank portion 40, the free end of which is hooked, as at 41, to engage beneath the closed end of a U-shaped staple like device 42 secured to the movable disc 22. Formed integral with the shank portion 35 is a pair of spaced arms 43, 43a which form a forked end. Carried by the free ends of the arms 43, 43a is a pivot pin 44 on which is mounted for oscillation a lever 45 which is disposed centrally between the arms 43, 43a and which is provided with an opening 46 therethrough. The arms 43, 43a are cut away as at 47, to leave fulcrum points 48, 48a. Each pin 38 extends through the opening 46 in a lever 45 and the head 38a of each pin overlies the opening and contacts with the upper face of the lever 45. The hooked end 41 of the shank portion 40 fits under the U-shaped member 42 on the movable disc 22. The edges 48, 48a bear directly on the clamping plate 19 and serve as fulcrum points for the compound lever when a braking pressure is applied. The longer lever, that is, the forked lever, has a mechanical advantage of approximately 3½:1 and the shorter lever, that is, the pivoted lever 45, has a mechanical advantage of approximately 2:1, so that the braking power applied to the hooked end 41 of the forked lever is multiplied by seven when it acts on a pin 38.

When a vacuum is drawn on the chamber between the discs 22 and 13, the shiftable disc 22 will be caused to move inwardly toward the stationary disc 13 and this movement will rock the forked lever about the edges 48 and 48a and, in turn, lift the lever 45 about its point of contact with the plate 19 so as to shift the pin 38 and the brake shoe 33 toward the stationary brake shoe 32. This movement of the levers will effect a braking contact between the shoes 33, 32 and the braking member 24, as shown in Fig. 3. When the vacuum on the chamber is released, a spring 49, which surrounds the pin 38 and bears on the annular portion 16 of the stationary disc 13 and on the annular member 34, will operate to separate the brake shoes and the discs.

There are air passages through the braking member 24 and openings through the inwardly directed portion 35 of the annular member 34 so that, as the braking member 24 rotates, a small amount of air is drawn in through the openings 39 and expelled by centrifugal force through the passages in the braking member 24 to cool the braking member. When the braking pressure is released, air will pass between the braking surfaces to afford a cooling effect. This passage of air also tends to centralize the braking member 24 with respect to the two brake shoes 32, 33.

According to the present invention, there is also provided a mechanical brake actuating means which is illustrated in detail in Figs. 1 and 2. A cable or rod 50 connects the operating pedal (not shown) with an arcuate bar 51, to each end of which are pivoted links 52, 52a. The opposite ends of the links 52, 52a are pivoted to the ends of arms 53, 53a respectively, which are connected to shafts 54, 54a respectively. The shafts 54, 54a are mounted in brackets 55, 55a respectively on the stationary member 11. The free ends of the shafts 54, 54a carry arms 56, 56a which are disposed at right angles to the axes of the shafts. The ends of the arms 56, 56a are adapted to contact with raised bearing plates 57, 57a which are carried by the clamping ring 20.

Upon failure of the fluid pressure operating means, it will be seen that the mechanical actuating means may be operated. A pull on the cable 50 will operate through the arcuate bar 51 and the links 52, 52a to move the arms 53, 53a. This movement of the arms 53, 53a will operate to rotate the shafts 54, 54a and thus press the arms 56, 56a against the plates 57, 57a on the clamping ring 20. The pressure thus exerted by the arms 56, 56a against the plates 57, 57a will move the shiftable disc 22 toward the stationary disc 13 and thus operate through the same lever mechanism to apply the braking pressure in the manner heretofore described.

From the foregoing description it will be seen that a highly efficient braking device is herewith provided wherein the braking force can be applied either by fluid pressure control actuation or by mechanical actuation. The mechanical operating means in no way interferes with the application of the brakes by the fluid pressure actuating means. In other words, the brakes can be operated independently by either the mechanical means or by the fluid pressure means. In either case, there is caused a relative movement between the two discs so that the compound lever mechanism operates to multiply the braking force normally exerted merely by the relative movement of the discs. The invention further provides an efficient manner of cooling the braking surfaces when they become heated due to the application of the braking force. This cooling of the braking surfaces adjacent the rim prevents the bead of the tire from being damaged by the transmission of heat thereto.

It is to be clearly understood that minor changes in the details of construction and arrangement of parts may be made without departing from the scope of the invention as set forth in the appended claims.

I claim:

1. In a braking device, the combination of a rotatable member, a braking member connected to said rotatable member for rotation therewith, a plurality of non-rotating discs, flexible means connecting said discs and forming therebetween a chamber adapted to be placed under vacuum for causing relative movement of said discs, brake shoes disposed on opposite sides of said braking member, a lever mechanism connecting said brake shoes with said discs whereby to effect relative movement of said brake shoes into contact with said braking member when the chamber between said discs is placed under vacuum and mechanically actuated means connected to said discs for effecting relative movement of said brake shoes into contact with said braking member through said lever mechanism.

2. In a braking device, the combination of a rotatable member, a braking member connected to said rotatable member for rotation therewith, a plurality of non-rotating discs, flexible means connecting said discs and forming therebetween a chamber adapted to be placed under vacuum for causing relative movement of said discs, a pair of relatively movable brake shoes disposed one on each side of said braking member, a compound lever mechanism connected to a movable disc and operating to effect relative movement of said brake shoes into contact with said braking member when the chamber between said discs is placed under vacuum, and mechanically actuated means operating through said lever mechanism for effecting relative movement of said brake shoes into contact with said braking member.

3. In a braking device, the combination of a rotatable member, a braking member connected to said rotatable member for rotation therewith, a stationary disc, a brake shoe carried by said stationary disc and disposed at one side of said braking member, a shiftable disc, flexible means connecting said shiftable disc to said stationary disc and forming therebetween a chamber adapted to be placed under vacuum for effecting movement of said shiftable disc toward said stationary disc, a movable brake shoe disposed on the opposite side of said braking member, a lever mechanism connecting said movable brake shoe with said shiftable disc and operating to multiply the effective braking force acting on the movable brake shoe, said lever mechanism including a plurality of pivoted levers, one of said levers being connected to said movable brake shoe and another of said levers being connected to said shiftable disc, and mechanically operated means for effecting movement of said shiftable disc toward said stationary disc whereby to apply the braking force through said lever mechanism.

4. In a braking device, the combination of a rotatable member, a braking member connected to said rotatable member for rotation therewith and for limited axial movement in respect thereto, a stationary brake shoe disposed at one side of said braking member, a movable brake shoe disposed at the opposite side of said braking member, a lever having a fulcrum point at one end thereof and being connected intermediate its ends to said movable brake shoe, a second lever pivoted to the opposite end of said first-named lever and having a fulcrum point intermediate its ends, and means connected to the free end of said second lever for rocking said lever about its fulcrum point whereby to shift said movable brake shoe so as to effect relative contact of said brake shoes with said braking member.

5. In a braking device, the combination of a rotatable member, a braking member connected to said rotatable member for rotation therewith and for limited axial movement in respect thereto, a stationary brake shoe disposed at one side of said braking member, a movable brake shoe disposed at the opposite side of said braking member, a disc disposed within said rotatable member and shiftable axially thereof, a lever having one end thereof connected to said shiftable disc and having a fulcrum point intermediate its ends, a second lever pivoted to the opposite end of said first-named lever and having a fulcrum point at the free end thereof, means connecting said movable brake shoe with said second lever intermediate its ends, and means for moving said shiftable disc whereby to actuate said lever mechanism and effect relative contact between said brake shoes and said braking members.

6. In a braking device, the combination of a rotatable member, a braking member having an angular slot therethrough connected to said rotatable member for rotation therewith and for limited axial movement relative thereto, spring means engaging said braking member at opposite sides of said slot for normally holding the said braking member in engagement with said rotatable member to prevent rattling but permitting expansion of said braking member when heated, relatively movable brake shoes disposed one on each side of said braking member, and means including a lever mechanism for effecting relative movement of said brake shoes into contact with said braking member.

7. In a braking device, the combination of a rotatable member, a braking member having an angular slot therethrough and a radial outwardly extending rib portion at one side thereof, said rib portion having spaced recesses, lugs on said rotatable member spaced symmetrically with respect to said recesses in said rib and disposed therein to connect said braking to said rotatable member for rotation therewith but permitting limited axial movement relative thereto, spring means engaging said rib at opposite sides of said slot for normally holding said rib in engagement with said lugs to prevent rattling but permitting expansion of said braking member when heated, relatively movable brake shoes disposed one on each side of said braking member, and means including a lever mechanism for effecting relative movement of said brake shoes into contact with said braking member.

8. In a braking device, the combination of a rotatable member, a braking member connected to said rotatable member for rotation therewith and for limited axial movement relative thereto, said braking member having radial openings therethrough whereby air will pass outwardly therethrough to cool the same, a stationary brake shoe disposed at one side of said braking member, a movable member disposed at the opposite side of said braking member, a brake shoe carried thereby, said movable member having a laterally directed portion underlying said braking member, said laterally directed portion having openings therethrough whereby air will pass between the braking surfaces to cool the same when the brake shoes are released, means for causing relative contact between said brake shoes and said braking member, and means for separating the brake shoes to release the braking force.

9. In a braking device, the combination of a rotatable member, a braking member having a radial outwardly extending rib portion connected to said rotatable member for rotation therewith and for limited axial movement relative thereto, said rib portion having a plurality of recesses at the edge thereof to permit circulation of air, said braking member having a relatively large number of radial openings therethrough for causing circulation of air over the braking member as it rotates with said rotatable member, relatively movable brake shoes disposed one on each side of said braking member, and means including a lever mechanism for effecting relative movement of said brake shoes into contact with said braking member.

FREDERICK L. SHELOR.